(12) United States Patent
Valiyambath Krishnan

(10) Patent No.: US 9,920,752 B2
(45) Date of Patent: Mar. 20, 2018

(54) FLUID PUMP

(71) Applicant: KONINKLIJKE PHILIPS N.V., Eindhoven (NL)

(72) Inventor: Mohankumar Valiyambath Krishnan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 252 days.

(21) Appl. No.: 14/442,104

(22) PCT Filed: Nov. 6, 2013

(86) PCT No.: PCT/IB2013/059927
§ 371 (c)(1),
(2) Date: May 12, 2015

(87) PCT Pub. No.: WO2014/076609
PCT Pub. Date: May 22, 2014

(65) Prior Publication Data
US 2016/0290325 A1    Oct. 6, 2016

Related U.S. Application Data

(60) Provisional application No. 61/726,034, filed on Nov. 14, 2012.

(51) Int. Cl.
*F04B 9/04* (2006.01)
*B06B 1/16* (2006.01)
(Continued)

(52) U.S. Cl.
CPC ............... *F04B 9/045* (2013.01); *B06B 1/02* (2013.01); *B06B 1/16* (2013.01); *B06B 1/161* (2013.01);
(Continued)

(58) Field of Classification Search
CPC .. B06B 1/161; B06B 1/02; B06B 1/16; D06F 75/14; F04B 17/03; F04B 43/04;
(Continued)

(56) References Cited

U.S. PATENT DOCUMENTS 1,742,183 A * 1/1930 Bell ..................... F02M 37/04
184/26
2,687,696 A * 8/1954 Theis ..................... F04B 9/042
417/362
(Continued)

FOREIGN PATENT DOCUMENTS

CN       101666308 A     3/2010
CN       101737319 A     6/2010
(Continued)

OTHER PUBLICATIONS

Gruber Bruno, DE 3908280 A1, Pump Appliance, Apr. 30, 1998, EPO, translation is machine-generated.*
(Continued)

*Primary Examiner* — Devon Kramer
*Assistant Examiner* — Benjamin Doyle

(57) ABSTRACT

A fluid pump includes a pump body having a fluid path with an inlet and an outlet. The fluid pump also includes a diaphragm disposed along the fluid path between the inlet and the outlet, a non-return valve to control direction of flow along the fluid path, and a diaphragm actuating unit. The diaphragm actuating unit includes an unbalanced motor. Further, a steam generator may include the fluid pump.

14 Claims, 2 Drawing Sheets

(51) Int. Cl.
*F04B 9/02* (2006.01)
*F04B 17/03* (2006.01)
*F04B 43/04* (2006.01)
*B06B 1/02* (2006.01)
*D06F 75/14* (2006.01)
*F04B 53/10* (2006.01)
*F04B 53/16* (2006.01)
*H02K 7/06* (2006.01)

(52) U.S. Cl.
CPC .............. *D06F 75/14* (2013.01); *F04B 9/02* (2013.01); *F04B 17/03* (2013.01); *F04B 43/04* (2013.01); *F04B 53/10* (2013.01); *F04B 53/16* (2013.01); *H02K 7/061* (2013.01)

(58) Field of Classification Search
CPC .. F04B 53/10; F04B 53/16; F04B 9/02; F04B 9/045; F04B 43/02; F04B 9/14; F04B 9/04; H02K 7/061; A47K 1/09; E01F 9/00; F16M 13/00; F16M 7/00; A47G 2200/106
USPC ............... 417/413.1; 74/86, 87, 61; 38/3
See application file for complete search history.

(56) References Cited

U.S. PATENT DOCUMENTS

| | | | | |
|---|---|---|---|---|
| 2,888,877 A * | 6/1959 | Shellman | ............... | F04B 43/04 251/9 |
| 2,917,751 A * | 12/1959 | Fry | ............... | A61M 1/1046 128/DIG. 3 |
| 2,930,324 A * | 3/1960 | Toulmin, Jr. | ............ | F04B 43/023 417/413.1 |
| 3,137,488 A * | 6/1964 | Toyer | ............... | B60G 7/04 267/269 |
| 3,348,664 A * | 10/1967 | Renner | ............... | B65G 27/20 198/761 |
| 3,545,894 A * | 12/1970 | Lovitz | ............... | A01K 63/042 137/850 |
| 3,669,573 A * | 6/1972 | Levensohn | ............ | A01K 63/047 310/36 |
| 3,830,596 A * | 8/1974 | Kondo | ............... | A01K 63/042 210/167.26 |
| 4,052,849 A * | 10/1977 | Dumbaugh | ............ | F16H 43/00 290/1 R |
| 4,162,876 A * | 7/1979 | Kolfertz | ............... | A01K 63/042 310/25 |
| 4,179,244 A * | 12/1979 | Marple | ............... | F04B 45/027 417/273 |
| 4,495,947 A * | 1/1985 | Motycka | ............... | A61M 16/0057 128/204.21 |
| 4,936,758 A * | 6/1990 | Coble | ............... | F04B 43/04 417/413.1 |
| 5,002,471 A * | 3/1991 | Perlov | ............... | F04B 43/0054 417/413.1 |
| 5,009,579 A * | 4/1991 | Grant | ............... | F04B 39/121 417/12 |
| 5,013,223 A * | 5/1991 | Takahashi | ............ | F04B 17/042 310/12.04 |
| 5,017,100 A * | 5/1991 | Arkans | ............... | F04B 43/04 137/903 |
| 5,742,954 A * | 4/1998 | Idland | ............... | A61H 33/6047 4/509 |
| 5,911,428 A * | 6/1999 | Ueda | ............... | B62K 21/20 280/276 |
| 6,070,861 A * | 6/2000 | Ecktman | ............... | B60G 7/04 267/64.27 |
| 6,082,979 A * | 7/2000 | Friedman | ............ | E03F 1/006 4/431 |
| 6,257,842 B1 * | 7/2001 | Kawasaki | ............ | F04B 39/0055 181/229 |
| 7,431,574 B2 * | 10/2008 | Onishi | ............... | F04B 43/046 417/413.1 |
| 8,485,542 B1 * | 7/2013 | Nine | ............... | B60G 9/04 280/124.17 |
| 9,315,084 B2 * | 4/2016 | Becker | ............... | B60G 9/022 |
| 2004/0010950 A1 * | 1/2004 | Leung | ............... | D06F 73/00 38/3 |
| 2006/0022535 A1 * | 2/2006 | Holman, IV | ............ | H02K 7/061 310/81 |
| 2007/0267940 A1 * | 11/2007 | Wright | ............... | F04B 43/04 310/311 |
| 2008/0279702 A1 * | 11/2008 | Kim | ............... | B65B 31/02 417/413.1 |
| 2009/0010778 A1 * | 1/2009 | Wang | ............... | F04B 43/026 417/413.1 |
| 2010/0065260 A1 * | 3/2010 | Sakamoto | ............ | B06B 1/045 165/121 |
| 2010/0074775 A1 * | 3/2010 | Yamamoto | ............ | F04B 43/028 417/413.2 |
| 2011/0103977 A1 | 5/2011 | Mandica | | |
| 2011/0103980 A1 | 5/2011 | Mandica | | |
| 2012/0200057 A1 * | 8/2012 | Juriga | ............... | B60G 9/00 280/124.116 |
| 2012/0315166 A1 * | 12/2012 | Looi | ............... | F04B 9/045 417/413.1 |
| 2013/0072866 A1 * | 3/2013 | Hegen | ............... | A61M 1/06 604/74 |
| 2013/0216402 A1 * | 8/2013 | Raasch | ............... | F04B 17/03 417/212 |
| 2013/0309108 A1 * | 11/2013 | Haeberer | ............ | F04B 43/04 417/413.1 |
| 2014/0023532 A1 * | 1/2014 | Ishii | ............... | F04B 17/044 417/413.1 |
| 2014/0023533 A1 * | 1/2014 | Ishii | ............... | F04B 35/045 417/413.1 |
| 2014/0097588 A1 * | 4/2014 | Del Pup | ............... | B60G 7/001 280/124.116 |
| 2015/0202936 A1 * | 7/2015 | Becker | ............... | B60G 9/00 280/124.106 |
| 2015/0316046 A1 * | 11/2015 | Kang | ............... | F04B 43/046 417/413.1 |
| 2016/0113831 A1 * | 4/2016 | Hollander | ............ | A61H 1/0244 623/31 |
| 2016/0290325 A1 * | 10/2016 | Valiyambath Krishnan | ............... | B06B 1/161 |

FOREIGN PATENT DOCUMENTS

| | | | | |
|---|---|---|---|---|
| CN | 201963527 U | 9/2011 | | |
| DE | 3908280 A1 * | 5/1990 | ............... | A47K 1/09 |
| DE | 102006057483 A1 | 6/2008 | | |
| GB | 2223092 A | 3/1990 | | |
| JP | 2004190611 A | 7/2004 | | |

OTHER PUBLICATIONS

"Diaphragm pump and the underneath type water-jug machine that contains the disphragm pump", Jun. 15, 2012, pp. 1-4, http://c2e.cnpat.com.cn/ShowXml.aspx?path=../xml/XX/2011/0907/9/201120071329.9 . . . .

* cited by examiner

FLUID PUMP

This application is the U.S. National Phase application under 35 U.S.C. § 371 of International Application No. PCT/IB2013/059927, filed on Nov. 6, 2013, which claims the benefit of U.S. Provisional Application No. 61/726,034 filed on Nov. 14, 2012. These applications are hereby incorporated by reference herein.

FIELD OF THE INVENTION

The present application relates to a fluid pump. The present application also relates to a steam generator including a fluid pump, and a steaming device including a steam generator with a fluid pump.

BACKGROUND OF THE INVENTION

In a steam iron or a steamer, a fluid pump is generally used to deliver water from a water storage chamber to a steam generating chamber. One type of fluid pump used to fulfil this function is a solenoid-based pump. A solenoid-based pump has a solenoid which is operated to cyclically actuate a piston or a diaphragm. However, such a fluid pump is generally heavy, expensive and requires a large volume of space in the housing of the iron or steamer due to the coil windings and plunger mechanism. Alternatively, a cam mechanism may be used to reciprocally operate a piston or diaphragm. A cam mechanism is generally rotatably driven by a drive shaft of an electric motor. Such a cam is fixedly mounted to the drive shaft of a geared DC electric motor, which acts on a piston to drive the piston in a reciprocal motion. However, the cam arrangement and DC motor required to drive the cam mechanism is large and heavy.

In an attempt to provide a compact and lightweight fluid pump a piezo-based actuating means may be used. However, such piezo-based pumps are expensive due to cost of the electronic driving circuits required to drive the ultrasonic vibration of the piezo element, the complex construction needed to remove heat from the piezo element for reliable operation, and the necessary voltage isolation to isolate the piezo element from the water pumped by the fluid pump.

SUMMARY OF THE INVENTION

It is an object of the invention to provide a pump which substantially alleviates or overcomes the problems mentioned above, amongst others.

According to one aspect of the present invention, there is provided a fluid pump comprising a pump body having a fluid path with an inlet and an outlet, a diaphragm disposed along the fluid path between the inlet and the outlet, a diaphragm actuating unit, and a non-return valve to control the direction of flow along the fluid path, wherein the diaphragm actuating unit comprises an unbalanced motor.

The above arrangement provides a very compact fluid pump. Furthermore, the cost of such a fluid pump is minimised and a lightweight pump is provided. It is also possible to deform the diaphragm without the provision of an additional actuating mechanism, such as a cam linking a motor to the diaphragm.

The unbalanced motor may be fixedly connected to the diaphragm. The unbalanced motor may be directly or indirectly connected to the diaphragm.

Therefore, the actuating force for deforming the diaphragm is provided by the inertia of the entire unbalanced motor. An actuation force is simply provided to the diaphragm, and energy is not lost due to any vibration of the motor.

A motor body of the unbalanced motor may be fixedly connected to the diaphragm.

With the above arrangements, the diaphragm is urged to move in a reciprocal motion due to the movement of the unbalanced motor. This causes the pumping action of the pump.

The unbalanced motor may comprise a running shaft and an eccentric element on the running shaft. This provides a simple means for providing an unbalanced motor.

The fluid pump may further comprise a motion constraining unit to constrain the motion of the unbalanced motor. The motion constraining unit may be directly or indirectly mounted to the unbalanced motor.

The above arrangement allows the motion of the unbalanced motor to be limited. Therefore, the motion of the unbalanced motor is controlled.

The motion constraining unit may be configured to constrain the degrees of freedom of motion of the unbalanced motor. The motion constraining unit may be configured to constrain the unbalanced motor to move substantially along one plane.

Therefore, the unbalanced motor may be urged to move in a reciprocal motion.

The motion constraining unit may be configured to pivotally mount the unbalanced motor to the pump body. Therefore, a means of mounting the unbalanced motor relative to the pump body is easily provided.

The motion constraining unit may be configured to restrict the amplitude of the motion of the unbalanced motor.

The above arrangement may assist in limiting the flow rate of fluid through the fluid pump. With the above arrangement, the diaphragm may be prevented from deforming beyond a normal operating condition. This helps to prevent damage to the diaphragm and the rest of the fluid pump.

The motion constraining unit may further comprise an amplitude adjuster such that the maximum amplitude of the motion of the unbalanced motor is adjustable.

In view of the forgoing, it is possible to control the flow rate of the fluid through the fluid pump by adjusting the maximum amplitude of the motion of the unbalanced motor.

The motion constraining unit may comprise a resilient member. The resilient member may be a leaf spring. This means that the motion of the unbalanced motor relative to the pump body may be easily constrained. The resilient member also urges the unbalanced motor to return to its neutral position, therefore preventing the diaphragm from being maintained in a deformed condition.

The motion constraining unit may comprise a motor holder.

The motion constraining unit may be on the pump body. Therefore, the motion constraining unit may be directly mounted between the pump body and the unbalanced motor. This means that the size of the fluid pump may be minimised.

The motion constraining unit may be on a housing in which the pump body is mounted. Therefore, the motion constraining unit may be indirectly mounted between the housing and the unbalanced motor.

The unbalanced motor may be a low voltage DC motor.

Therefore, it is possible to minimise the size and weight of the fluid pump by using a small and lightweight actuation means to actuate the diaphragm. It is also possible to minimise the power required to operate the fluid pump. The fluid pump may also have a power supply such as a battery or supercapacitor. Therefore, it is possible to maximise the battery life of a battery or supercapacitor when used as a power supply. The use of a battery or supercapacitor enables the fluid pump to be used in a cordless appliance.

The fluid pump may further comprise a controller arranged to operate the unbalanced motor to control the flow rate of the fluid pump.

This allows the flow rate of the fluid pump to be varied. In particular, this allows that the flow rate of the fluid pump to be varied in response to a desired input.

The controller may be arranged to operate the motor using pulse-width modulation PWM. PWM control can help to control the flow rate of fluid through the pump by varying the PWM duty cycle accordingly. This allows the flow rate to be accurately controlled.

The fluid pump may be configured to pump water.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
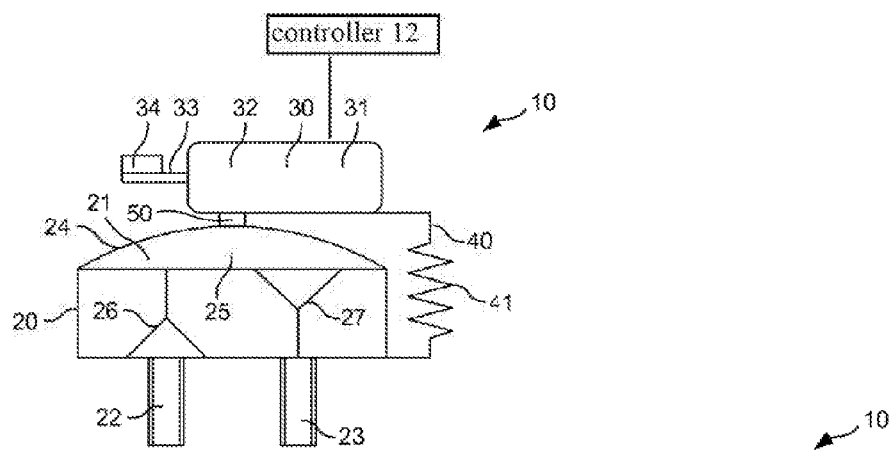
FIG. 1 shows a schematic cross-sectional view of a fluid pump.
Figure 2:
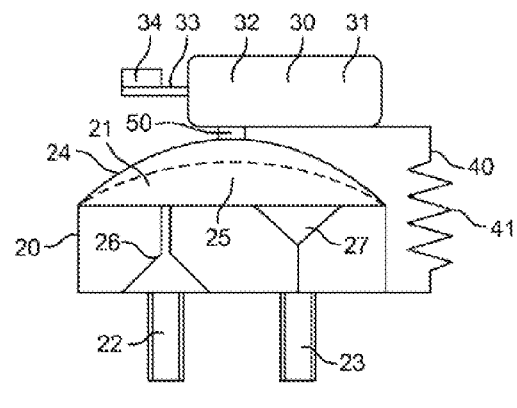
FIG. 2 shows a schematic cross-sectional view of the fluid pump shown in FIG. 1 with a diaphragm in a first operating condition.
Figure 3:
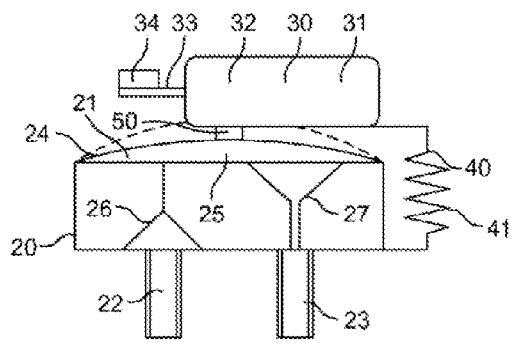
FIG. 3 shows a schematic cross-sectional view of the fluid pump shown in FIG. 1 with the diaphragm in a second operating condition.

Referring to FIGS. 1 to 3, a fluid pump 10 is shown. The fluid pump 10 forms part of a steam generator (not shown). The fluid pump 10 is configured to pump water. With this arrangement, the fluid pump 10 pumps water from a water chamber (not shown) and deliver the water to a steam generating chamber (not shown). Although the embodiments shown herein are configured to pump water it will be understood that the fluid pump is not limited thereto, and may be configured to pump other types of fluid. That is, the fluid pump may be configured to pump another type of liquid or a gas.

The fluid pump 10 comprises a housing (not shown), a pump body 20, and a diaphragm actuating unit 30. The pump body 20 and the diaphragm actuating unit 30 are received in the housing. The fluid pump 10 also comprises a motion constraining unit 40. The motion constraining unit 40 constrains the motion of the diaphragm actuating unit 30, as will become apparent hereinafter. The motion constraining unit 40 is also received in the housing.

The pump body 20 comprises a fluid path 21 formed therethrough. An inlet 22 is provided to the fluid path 21, and an outlet 23 is provided to the fluid path 21. Therefore, it will be understood that the fluid path 21 is formed between the inlet 22 and the outlet 23.

A diaphragm 24 is disposed along fluid path 21. The diaphragm is mounted to the pump body 20. The diaphragm 24 is a flexible membrane. A diaphragm chamber 25 is defined by the diaphragm. That is, the diaphragm 24 forms a face, acting as a bounding portion, of the diaphragm chamber 25. The diaphragm 24 is deformable to vary the volume of the diaphragm chamber 25. The diaphragm chamber 25 forms part of the fluid path 21. Therefore, diaphragm chamber 25 is formed between the inlet 22 and the outlet 23.

It will be understood that the volume of the diaphragm chamber 25 will vary when the diaphragm is deformed. The diaphragm 24 is formed from a flexible material, such as rubber, although other suitable materials may be used. The diaphragm 24 is formed from a resilient material. The diaphragm 24 may, for instance, be shaped like a sheet or a bellow.

A first non-return valve 26, also known as a check valve or a one-way valve, is disposed along the fluid path 21. The first non-return valve 26 is disposed proximate to the inlet 22. That is, the first non-return valve 26 is disposed between the inlet 22 and the diaphragm chamber 25. In the present arrangement, the first non-return valve 26 is disposed in the pump body 20. However, the first non return valve 26 may be disposed at the inlet 22 or before the inlet 22. The first non-return valve 26 is conventional and so a further description of the first non-return valve 26 will be omitted herein.

A second non-return valve 27 is disposed along the fluid path 21. The second non-return valve is disposed proximate to the outlet 23. That is, the second non-return valve 27 is disposed between the diaphragm chamber 25 and the outlet 23. In the present arrangement, the second non-return valve 26 is disposed in the pump body 20. However, the first non return valve 26 may be disposed at the outlet 23 or after the outlet 23. The second non-return valve 27 is conventional and so a detailed description will be omitted herein.

The first non-return valve 26 is configured to allow the flow of a fluid, such as water, in a direction from the inlet 22 to the diaphragm chamber 25. The first non-return valve 26 is configured to prevent the flow of fluid from the diaphragm chamber 25 to the inlet 22. The second non-return valve 27 is configured to allow the flow of a fluid in a direction from the diaphragm chamber 25 to the outlet 23. The second non-return valve 27 prevents the flow of fluid from the outlet 23 to the diaphragm chamber 25. Therefore it will be understood that flow along the fluid path 21 is allowed in one direction only. It will be appreciated that in another arrangement one of the non-return valves 26, 27 may be omitted. For example, in another embodiment the second non-return valve 27 may be omitted so that fluid is prevented from flowing between the inlet and the diaphragm chamber 25, but is allowed to flow freely between the diaphragm chamber and the outlet 23. In an alternative arrangement, the first non-return valve 26 is omitted.

The diaphragm actuating unit 30 includes an unbalanced motor 31. The unbalanced motor is a low voltage DC motor. That is, the electric motor is configured to have a rating of less than or equal to 12 volts and less than or equal to 1 amp, and in particular, 0.5 amps. It will be understood that an alternative type of unbalanced motor may be used. The power supply unit (not shown) supplies power to the motor 31. The power supply unit may be mains operated, or may be powered by a super capacitor or a battery. The motor is operated by a controller 12. The controller is arranged to operate the motor 31 using voltage and/or current control. The controller is a simple switch or a PCB with control electronics. The controller may be arranged to operate the motor 31 using pulse-width modulation PWM.

The unbalanced motor 31 comprises a motor body 32 and a running shaft 33. The running shaft 33 has an eccentric element 34. Although the running shaft 33 and eccentric element 34 are shown extending from the motor body in FIGS. 1 to 3, it will be understood that the running shaft 33 and/or the eccentric element 34 may be disposed in the motor body 32. The eccentric element 34 may be integrally formed with the running shaft 33. The running shaft 33, together with the eccentric element 34, is configured to rotate relative to the motor body 32 when the motor 31 is operated. A stator coil (not shown) is fixedly mounted in the motor body 32. The stator, acting as an energising force provider, is energised when power is supplied to the motor 31. A rotor (not shown) is fixedly mounted to the shaft 33. The rotor and part of the running shaft 33 are received in the stator and are rotably mounted in the motor body 32. The running shaft 33 is rotatable about its longitudinal axis. The shaft 33 and eccentric element 34 act as an actuating force provider. Rotation of the shaft 33, together with the eccentric element 34, relative to the motor 32 causes movement of the motor 31. That is, the unbalanced motor 31 is urged to vibrate.

The eccentric element 34 is an unbalanced mass. The eccentric element 34 has a centre of mass which is out of alignment with the rotational axis of the running shaft 33. Therefore, the running shaft 33, together with the eccentric element 34, has a centre of mass which does not coincide with the rotational axis about which the shaft 33 rotates. The eccentric element 34 is fixedly mounted to an end of the shaft 33. The eccentric element 34 may be integrally formed with the shaft 33 or may be attached thereto.

The motor 31 is mounted to the diaphragm 24. That is, a connector 50 fixedly attaches the motor 31 to the diaphragm 24. The connector 50 extends between an outer surface of the motor body 32 and an outer surface of the diaphragm 24. Therefore it will be understood that a movement of the motor 31 will cause the diaphragm 24 to deform. The connector 50 may be omitted. Therefore, the motor 31 may be directly or indirectly connected to the diaphragm 24. The diaphragm 24 is attached to the motor 31 or connector 50 by known means, and so a further detailed description will be omitted herein.

The motion constraining unit 40 extends between the motor 31 and the pump body 20. The motion constraining unit 40 acts to constrain the motion of the unbalanced motor 31 relative to the pump body 20. That is, the motion constraining unit 40 is arranged to restrict the degrees of freedom of movement of the motor 31 relative to the pump body 20. The motion constraining unit 40 is also arranged to restrict the amplitude of movement of the motor 31 relative to the pump body 20. However, it will be understood that in an alternative embodiment the motion constraining unit 40 is arranged to restrict the degrees of freedom of movement of the motor 30 or the amplitude of the movement of the motor 31 about the pump body 20 only. Alternatively, the motion constraining unit forms part of the diaphragm. With such an arrangement, the diaphragm houses and/or attaches the unbalanced motor and limits the unbalanced motor to a preferential vibration plane or orientation. That is, the diaphragm is designed and shaped to flex significantly in one plane compared to flexing in other planes.

Although in the above arrangement the motion constraining unit 40 extends between the motor 31 and the pump body 20, it will be understood that in an alternative arrangement the motion constraining unit 40 may extend between the connector 50 and the pump body 20. Alternatively, the motion constraining unit 40 extends between the motor 31, or connector 50, and the housing or a supporting body (not shown). In such an arrangement, it will be understood that the pump body 20 is fixedly mounted to the housing or supporting body.

The motion constraining unit 40 comprises a leaf spring 41, acting as a resilient member. The leaf spring 41 extends between the motor body 32 and the pump body 20. The leaf spring 41 is fixedly mounted to the pump body 20 at one end. The leaf spring 41 is fixedly mounted to the motor body 32 at the other end. The leaf spring 41 is fixedly mounted to the pump body 20 and the motor body 32. Alternatively the leaf spring 41 may be fixedly mounted to the connector 50 and/or the housing (not shown).

The leaf spring 41, acting as a resilient member, retains the unbalanced motor 31 in a neutral position with respect to the pump body 20. That is, the motor body 32 is in a predetermined position relative to the pump body 20 when the motor 31 is non-operational. In this position the diaphragm 24 attached to the motor body 32 is in a neutral condition. That is, the diaphragm 24 is disposed in a generally undeformed or neutral condition.

The leaf spring 41, forming part of the motion constraining unit 40, acts to significantly constrain the vibration of the motor 31 along a single plane when the motor 31 is urged to move. The leaf spring 41 also acts to constrain the amplitude of motion of the motor 31 relative to the pump body 20.

Although the resilient member, forming part of the motion constraining unit 40, is a leaf spring in the present arrangement, it will be understood that an alternative resilient member may be used. For example, the resilient member may be an alternative type of spring, such as any suitable compression or tension spring or a combination thereof. In the present arrangement shown in FIG. 1, the leaf spring is fixedly mounted between the motor body 32 and the pump body 20. However, it will be understood that a first mount (not shown) may extend between the leaf spring 41, acting as a resilient member, and the motor body 32. Similarly, a second mount (not shown) may extend between the leaf spring 41, acting as a resilient member, and the pump body 20.

Operation of the fluid pump 10 will now be described with reference to FIGS. 1 to 3. Fluid pump 10 will be described as part of a steam generator (not shown), however it will be understood that the fluid pump 10 may form part of an alternative apparatus.

The fluid pump 10 is disposed in the steam generator between the water chamber and the steam generation chamber. The fluid pump 10 is provided to deliver water from the water chamber (not shown) to the steam generation chamber (not shown).

To operate the fluid pump 10, the controller 12 is arranged to supply power to the motor 31 using a pulse-width modulation (PWM) method to switch the supply voltage on or off with the required switching frequency and duty cycle. Alternatively, the controller is arranged to supply power to the motor 31 using an alternative method, such as simple voltage or current control. When power is supplied to the motor 31, the shaft 33 and the eccentric element 34 are urged to rotate about the rotational axis of the shaft 33, relative to the motor body 32. The unbalanced portion of the motor 31, comprising the shaft 33, the eccentric element 34, and the rotor (not shown), is urged to rotate. The unbalanced portion has an uneven distribution of mass about its axis of rotation defined by the axis of rotation of the running shaft 33. This unbalance creates a movement as the shaft 33 and eccentric element 34 start to rotate relative to the motor body 32 which causes the entire motor 31 to vibrate. The unbalanced motor 31 is initially in its neutral position, and the diaphragm 24 is in its initial neutral condition. The motor 31 is urged to vibrate as the running shaft 33 rotates. That is, the motor 31 is urged to move relative to the pump body 20. It will be understood that the rotation of the shaft 23 causes the motor 31, including the motor body 32, to displace from its neutral position.

The motor body 32 vibrates when the motor 31 is operated. The motor body 32 therefore moves relative to the pump body 20. As the motor body 32 displaces from its neutral position, the diaphragm 24 is urged to deform. Therefore, the diaphragm 24 is urged to deform from its neutral condition due to the movement of the motor 31. The leaf spring 41, acting as part of the motion constraining unit 40, acts to constrain the movement of the motor in a single plane relative to the pump body 20. In the present arrangement, the motion constraining unit 40 acts to constrain the motion of the motor 31 relative to the pump body 20 towards and away from the pump body 20. It will be understood that use of the inertia of the motor 31 created by the unbalance of the motor is maximised by restricting the motion of the motor 31 along a single plane.

The motor body 32 is urged to move in a reciprocal motion when the motor 31 vibrates. In the present arrangement, the leaf spring, forming part of the motion constraining unit 40, significantly constrains the movement of the motor body along a single plane. The motor 31 displaces between first and second actuating positions as the motor body 32 vibrates. The motor 31 moves away from the pump body 20 when the motor 31 moves into its first actuating position. The first actuating position is shown in FIG. 2. In this first position, the motor body 32 has displaced away from the pump body 20. As the diaphragm 24 is fixedly mounted to the motor body 32, the diaphragm is urged to deform into a first operating condition. The first operating condition is shown in FIG. 2, with the undeformed or neutral condition of the diaphragm shown by a dashed line. The volume of the diaphragm chamber 25 increases when the diaphragm 24 is urged to deform into its first operating condition due to the inertia of the motor 31, as shown in FIG. 2. As the volume of the diaphragm chamber 25 increases, the pressure in the diaphragm chamber decreases causing a pressure differential on either side of the first non-return valve 26. This pressure differential between the diaphragm chamber 25 and the inlet 22 causes the first non-return valve 26 to open. Fluid is then drawn through the first non-return valve 26 from the inlet 22 into the diaphragm chamber 25. Therefore, there is a flow of fluid from the inlet 22 into the diaphragm chamber 25 through the first non-return valve 26.

As the motor continues to vibrate the inertia of the motor 31 due to the unbalance of the shaft 33 and eccentric element 34 causes the motor body 32 to move to the second actuated position, as shown in FIG. 3. It will be understood that the leaf spring 41, acting as part of the motion constraining unit 40, acts to limit the movement of the motor body 32 along a single plane.

The motion of the motor body 32, as the motor moves into its second actuating position due to the inertia of the whole motor 31, causes the diaphragm 24 to deform into its second operating condition, as shown in FIG. 3. The volume in the diaphragm chamber decreases as the diaphragm deforms between its first and second operating conditions. The pressure in the diaphragm chamber 25 increases as the diaphragm 24 is urged to deform into its second operating condition due to the inertia of the motor. This causes a pressure differential on either side of the first and second non-return valves 26, 27. That is, the increased pressure in the diaphragm chamber causes the first non-return valve 26 to close. The increased pressure in the diaphragm chamber 25 compared to the outlet 23 causes the second non-return valve 27 to move into an open position. Therefore fluid is allowed to flow into the diaphragm chamber 25 through the second non-return valve 27 to the outlet 23 of the pump body 20. Fluid is prevented from flowing back through the pump body from the diaphragm chamber 25 to the inlet 22 due to the first non-return valve 26 moving into a closed position.

It will be understood that the vibration of the motor 31 causes the motor to move in a reciprocating motion. This means that, the inertia caused by the vibration of the unbalanced motor 31 causes the motor 31 to move between its first and second actuating positions when the motor 31 is operated. This reciprocal motion of the motor 31, in particular the motor body 32 to which the diaphragm 24 is mounted, causes the diaphragm 24 to move between its first and second operating conditions as shown in FIGS. 2 and 3. Therefore the first and second non-return valves 26, 27 are alternative opened and fluid is alternately drawn into the diaphragm chamber from the inlet 22 and urged from the diaphragm chamber 25 to the outlet 23 as the diaphragm 24 deforms.

In view of the foregoing, vibration of the motor 31 causes the diaphragm 24 to move in a reciprocal motion and so a pumping action is created to draw fluid from the inlet 22 to the outlet 23 of the pump body 20. Fluid is prevented from flowing in the opposite direction, i.e. from the outlet 23 to the inlet 22 of the pump body 20 by the action of the first and second non-return valves 26, 27. It will be understood that one of the non-return valves 26, 27 may be omitted in an alternative embodiment.

An advantage of the above arrangement is that vibration of the motor itself enables the diaphragm 24 to deform in a reciprocal manner. Therefore, it is not necessary to provide any mechanism linking the running shaft 33 of the motor 31 to the diaphragm 24 to cause the diaphragm 24 to deform. In particular it is not necessary to provide a cam or alternative arrangement linking the running shaft of the motor to the diaphragm. Such an arrangement, having a cam, piston or the like, may be prone to failure. Furthermore, the size of the fluid pump may be minimised as it is not necessary to provide any mechanism linking the motor to the diaphragm apart from mounting the motor body 32 directly to the diaphragm 24. This also ensures that weight, cost and size of the actuating means for the fluid pump 10 are minimised.

The motion constraining unit 40 acts to limit the amplitude of motion of the motor 31 relative to the pump body 20. Therefore the motion constraining unit 40, in this case formed by the leaf spring 41, acts to limit deformation of the diaphragm 24. Therefore damage due to the diaphragm deforming beyond its normal operating conditions are prevented.

When the controller 12 operates the motor 31 to drive the diaphragm 24, it will be understood that the flow rate through the fluid pump 10 may be controlled by limiting the operating frequency of the diaphragm 24 and/or by limiting the amplitude movement of the diaphragm 24. The operating frequency of the diaphragm may be controlled by the controller which is arranged to control the rotational speed of the motor. Therefore if the rotational speed of the motor 31 is reduced then the flow rate through the fluid pump 10 will be reduced. It will be understood that in one embodiment the flow rate through the fluid pump is controlled solely by determining the rotational speed of the motor 31. In another embodiment, it will be understood that the flow rate through the fluid pump may be controlled by limiting or adjusting the amplitude of the displacement of the unbalanced motor. For example, in one embodiment one or more stoppers 64 may be used to limit the amplitude of displacement of the motor 31. The one or more stoppers 64 form part of the motion constraining unit 40, 60. The one or more stoppers 64 act as an amplitude adjuster, although the amplitude adjuster may have an alternative arrangement. The one or more stopper 64 may be adjustable to adjust the flow rate of the fluid pump.

Figure 4:
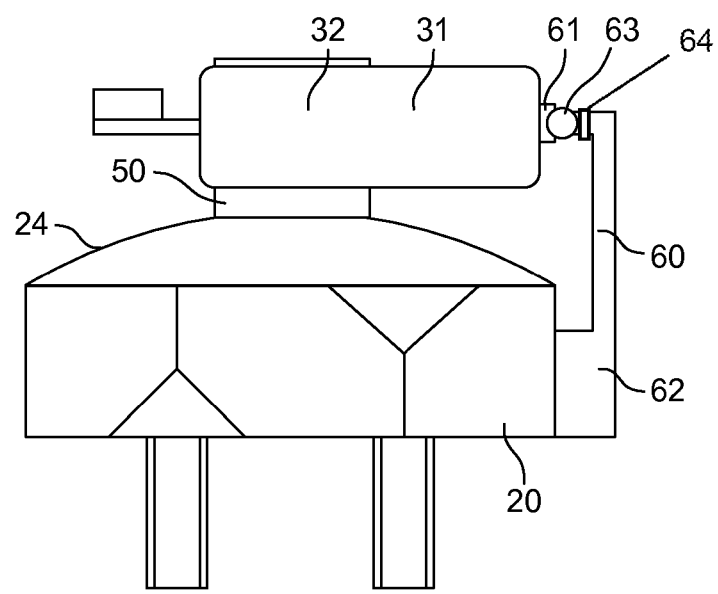
FIG. 4 shows a schematic cross-sectional view of another embodiment of a fluid pump.

Referring now to FIG. 4, an alternative embodiment of the fluid pump is shown. This embodiment of a fluid pump is generally the same as the embodiment described with reference to FIGS. 1 to 3 and so a detailed description will be omitted herein. However, in this embodiment a different motion constraining unit is used. As the fluid pump is generally the same as the fluid pump described above with reference to FIGS. 1 to 3 a detailed description will be omitted herein, and the same terminology and reference numerals will be used.

The fluid pump 10 shown in FIG. 4 has a motion constraining unit 60 extending between the motor body 32 and the pump body 20. The motion constraining unit 60 comprises a first mount 61 extending from the motor body 32, and a second mount 62 extending from the pump body 20. The first and second mounts 61, 62 are pivotally mounted to each other. That is, the first and second mounts 61, 62 are connected by a hinge 63. The motor body 32 is pivotally mounted to the pump body 20. Alternatively, it will be understood that the first mount 61 of the motion constraining unit 60 may extend from the connector 50, and/or the second mount 62 may extend from the housing (not shown).

The motor, in particular the motor body 32, is urged to move between its first and second actuating positions due to the inertia created by the unbalanced portion of the motor when the motor 31 is operated. The inertia of the motor 31 causes the diaphragm 24 to deform between its first and second operating conditions. It will be understood that the motion constraining unit 60 acts to constrain the motion of the motor 31 by limiting its motion to rotation about the pivot axis of the hinge 63. Therefore, the motor 31 is able to move only along a single path relative to the pump body 20. The hinge 63 may have one or more stoppers 64 to limit the amplitude of movement of the motor 31. Therefore deformation of the diaphragm 24 would be limited. Alternative stopping arrangement may be used.

Although different motion constraining unit arrangements are described in FIGS. 1 to 4, it will be understood that further motion constraining units are envisaged. For example, in an alternative arrangement the motion constraining unit may comprise a guide rod, acting as a guide member, which is received in a guide holder. In such an arrangement the guide member may extend from the motor body and be received in an aperture formed in the pump body which acts as a guide holder. The interaction of the guide member in the guide holder would act to constrain the motion of the unbalanced motor relative to the pump body. Alternatively, the guide member may extend from the pump body or the housing and be received in a guide holder on the motor.

In an alternative arrangement the motor body is received in a motor holder (not shown) and the diaphragm and/or the motion constraining unit may form part of or extend from the motor holder.

It will be understood that the above embodiments provide a very compact, lightweight and cheap fluid pump. The above arrangements eradicate the need for any actuating mechanism linking the actuator, for example the motor, and the diaphragm to cause the diaphragm to move. Furthermore, by constraining the motion of the motor relative to the pump body it is possible to maximise the efficiency of the fluid pump. It will be understood that it is the inertia of the whole motor, acting as an actuator, which drives the diaphragm and not a component part of the actuator, for example a drive shaft via an operating mechanism, which is used to operate the fluid pump. This also ensures that any vibration of the motor is not wasted.

It is understood that the fluid pump described in the above embodiments is used in a steam generator to provide water from a water chamber to a steam generating chamber. Such a steam generator is used in a hand-held steamer or a steam iron, for example a cordless iron, where compactness, weight and cost are of importance. However, it will be understood that use of the fluid pump is not limited to such an operation and that the fluid pump as described in the above embodiments may be used in an alternative apparatus.

It will also be understood that the controller may be arranged to operate the motor to have a predetermined flow rate profile such that the flow rate provided through the fluid pump is varied dependent on another variable parameter. It is also understood that the power supply may be a super capacitor or a battery or a mains operated power supply. Furthermore it may be understood that the flow rate is dependent on the power of the motor, the unbalance of the running shaft and eccentric element, the rotational speed of the motor, and the diaphragm size, amongst others.

One advantage of the fluid pump arrangements described above is that, if the flow path or the flow of water along the flow path is blocked, the running shaft of the motor is able to continue to rotate, and so burn out of the motor is prevented. Therefore, failure of the fluid pump is minimised.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A fluid pump comprising:
   a pump body having a fluid path with an inlet and an outlet;
   a diaphragm disposed along the fluid path between the inlet and the outlet;
   a non-return valve to control direction of flow along the fluid path;
   a diaphragm actuator comprising an unbalanced motor;
   a motion constraining unit to constrain a motion of the unbalanced motor; and a controller configured to adjust an amplitude of the motion of the unbalanced motor by adjusting power to the unbalanced motor, wherein the motion constraining unit has a hinge and is configured to pivotally mount the unbalanced motor to the pump body through the hinge.

2. The fluid pump according to claim 1, wherein the unbalanced motor is fixedly connected to the diaphragm.

3. The fluid pump according to claim 2, wherein a motor body of the unbalanced motor is connected to the diaphragm.

4. The fluid pump according to claim 1, wherein the motion constraining unit is configured to constrain degrees of freedom of the motion of the unbalanced motor.

5. The fluid pump according to claim 4, wherein the motion constraining unit is configured to constrain the unbalanced motor to move substantially along one plane.

6. The fluid pump according to claim 5, wherein the motion constraining unit is configured to restrict the amplitude of the motion of the unbalanced motor.

7. The fluid pump according to claim 6, wherein the motion constraining unit comprises at least one stopper such that a maximum amplitude of the motion of the unbalanced motor is limited by the at least one stopper.

8. The fluid pump according to claim 7, wherein the motion constraining unit comprises a resilient member.

9. The fluid pump according to claim 8, wherein the resilient member is a leaf spring.

10. The fluid pump according to claim 9, wherein the motion constraining unit is on the pump body or a housing in which the pump body is mounted.

11. The fluid pump according to claim 1, wherein the unbalanced motor is a low voltage DC motor.

12. The fluid pump according to claim 1, wherein the controller is configured to operate the unbalanced motor to control a flow rate of the fluid pump.

13. A steam generator comprising a fluid pump, the fluid pump comprising: a pump body having a fluid path with an inlet and an outlet; a diaphragm disposed along the fluid path between the inlet and the outlet; a non-return valve to control direction of flow along the fluid path; a diaphragm actuator comprising an unbalanced motor; a hinge; a motion constraining unit to constrain a motion of the unbalanced motor; and a controller configured to adjust an amplitude of motion of the unbalanced moto motor by adjusting power to the unbalanced motor, wherein the motion constraining unit has a hinge and is configured to pivotally mount the unbalanced motor to the pump body through the hinge.

14. The steam generator of claim 13, wherein the hinge includes a stopper configured to limit the amplitude of the motion of the unbalanced motor.

* * * * *